United States Patent
Petry et al.

(10) Patent No.: US 6,538,985 B1
(45) Date of Patent: Mar. 25, 2003

(54) CHANNEL RESERVATION MEDIA ACCESS CONTROL PROTOCOL USING ORTHOGONAL FREQUENCY DIVISION MULTIPLEXING

(75) Inventors: Brian David Petry, San Diego, CA (US); John Bernard Dougall, Jr., Highland, UT (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/318,533

(22) Filed: May 25, 1999

(51) Int. Cl.[7] ............... H04J 11/00; H04J 3/16
(52) U.S. Cl. ............ 370/203; 370/437; 370/445
(58) Field of Search ............... 370/203, 329, 370/330, 346, 343, 437, 438, 449, 503, 377, 445, 443, 444, 447, 448, 461, 401, 210, 480, 344, 535, 537

(56) References Cited

U.S. PATENT DOCUMENTS

| | | | |
|---|---|---|---|
| 5,802,044 A | * 9/1998 | Baum et al. | 370/330 |
| 5,963,557 A | * 10/1999 | Eng | 370/276 |
| 6,175,550 B1 | * 1/2001 | van Nee | 370/206 |
| 6,192,026 B1 | * 2/2001 | Pollack et al. | 370/203 |
| 6,222,851 B1 | 4/2001 | Petry | 370/447 |
| 2001/0055320 A1 | * 12/2001 | Pierzga et al. | 370/480 |

OTHER PUBLICATIONS

"Part 3: Carrier Sense Multiple Access With Collision Detection (CSMA/CD) Access Method And Physical Layer Specifications", IEEE Standard 802.3, 2000, pp. i–27.
"Splitterless Asymmetric Digital Subscriber Line (ADSL) Transceivers", ITU-T G.992.2, Jun. 1999, pp. i–165.

* cited by examiner

*Primary Examiner*—David Vincent
(74) *Attorney, Agent, or Firm*—McDonnell Boehnen Hulbert & Berghoff

(57) ABSTRACT

A contention resolution media access control protocol for a local area network (LAN) using orthogonal frequency division multiplexing (OFDM). The protocol takes advantage of OFDM frames available on the channel physical layer. Each LAN node is assigned a LAN-unique node identifier that is the index of a Fast-Fourier transform (FFT) frequency bin or other discrete tone in the free band. The node identifier is played in each contention cycle by each node that has data to transmit. Each contending node can easily determine which nodes are contending for transfer of data over the media channel from the presence of node identifiers within distinct frequency bins. Contention for the media channel is resolved by each contending node being giving access to the media channel in accordance with a preset order in which contending nodes will transmit.

21 Claims, 4 Drawing Sheets

Contention/Transmission Timeline

Contention/Transmission Timeline
with Guard Tone

Contention/Transmission Timeline
with SOT/EOT signals

CHANNEL RESERVATION MEDIA ACCESS CONTROL PROTOCOL USING ORTHOGONAL FREQUENCY DIVISION MULTIPLEXING

TECHNICAL FIELD

This invention relates to local area network technology, and more particularly to a contention resolution media access control protocol for a local area network using orthogonal frequency division multiplexing.

BACKGROUND

Digital Subscriber Line (DSL) communication systems use existing telephone lines for high speed data communications. A DSL system essentially encodes digital data as analog signals at very high data rates using special modems. One signaling method used to transmit such analog signals is orthogonal frequency division multiplexing (OFDM), in which analog encoded data bits are transmitted as complex tones in a plurality of distinct frequency bins.

A number of Digital Subscriber Line (DSL) systems have been proposed. For example, a version known as Asynmmetric Digital Subscriber Line (ADSL) provides a system that applies signals over a single twisted-wire pair that supports "plain old telephone service" (POTS) and high-speed duplex (simultaneous two-way) and simplex (from a network to the customer installation) digital services. Part of the proposed standard for ADSL is set forth in the Draft Proposed Revision of ANSI T1.413-1995—Interface Between Networks and Customer Installation—Asymmetric Digital Subscriber Line (ADSL) Metallic Interface (Sep. 26, 1997), which is hereby incorporated by reference.

Local area networks (LANs) allow multiple users (or "nodes") to utilize a shared media, such as a twisted-pair wiring, to transmit and receive digital information. The concept of OFDM signaling is so useful that attempts are being made to extend DSL technology to LAN communication systems.

In order to permit sharing of a LAN media, a media access control (MAC) protocol is commonly used to resolve "contention" between the users seeking to access the media simultaneously. A MAC layer protocol is basically responsible for sorting-out contention on a shared medium broadcast channel. The protocol maintains states, timers, methods, etc. for managing when and how nodes transmit on the shared medium. For conventional serial transmission wired media, such as those complying with the IEEE 802.3-XX and Ethernet standards, industry has widely accepted CSMA/CD (carrier sense multiaccess with collision detection) as a method of resolving contention. However, CSMA/CD is not particularly efficient under load.

For OFDM-based LANs, a variety of possible MAC protocols have been proposed. One such MAC protocol is described in U.S. patent application Ser. No. 09/003,844, entitled "Method and Protocol for a Medium Access Control Layer for Local Area Networks with Multiple-Priority Traffic," filed Jan. 7, 1998 and assigned to the assignee of the present invention. In this MAC protocol, each node waits for a certain period of silence, then transmits a single randomly selected tone as an intent-to-transmit signal. All nodes receive the combined intent-to-transmit signals of all other signals. Each node makes a determination as to whether it had transmitted the highest frequency, and if so, begins to transmit data. If two or more nodes had sent the same frequency as an intent-to-transmit signal, a collision will occur, indicated by the presence of garbled data on the medium. The colliding nodes stop transmitting data and repeat the process above until no collisions exist. A drawback of this protocol is that each transmitting node must "listen" to what it is transmitting to detect a collision, which requires data demodulation. Data demodulation requires a substantial expenditure of processing resources and complex processing. Further, if collisions occur, time is spent resolving contention for the media rather than transmitting data.

Another MAC protocol is described in U.S. patent application Ser. No. 09/087,624, entitled "Adaptive Tree-based Contention Resolution Media Access Control Protocol", filed May 29, 1998 and assigned to the assignee of the present invention. This protocol uses constant tones in frequency bins to resolve contention between multiple transmitting nodes. All nodes are synchronized to transmit "contention tones" in a "contention frame." Each node is assigned a unique identification (ID) number, and this ID number is mapped to frequency bins by transmitting a tone in each bin corresponding to each 1-bit in the binary representation of the node's ID number. The result of multiple nodes each transmitting its unique ID during a contention frame is a complex frequency signal which each participating node decodes. The nodes then participate in a "resolution frame" in which all nodes again transmit tones in frequency bins. The resolution frame tones correspond only to tones in which the result of the contention frame indicated the presence of a tone where such node had 0-valued ID bits. All nodes receive the results of the resolution frame and record the results ("resolution bits") in a reasonably-balanced binary tree. If the resolution frame contained no tones in any frequency bin, only one node is contending and can transmit. Otherwise, the contending nodes utilize the resolution bits to continue with another cycle of contention and resolution frames. Each node follows a tree-traversal algorithm to determine the order of transmission among all contending nodes. The contention process continues until all contending nodes have transmitted their frames.

While this last protocol provides positive identification of idle media, and does not require data demodulation, it still involves some computational complexity and, if media contention occurs, time is spent resolving the contention rather than in transmitting data.

Accordingly, the inventors have determined that it would be useful to have a contention resolution MAC protocol that is simple to implement, does not require data demodulation, does not require collision detection to resolve contention, and minimizes the time spent in resolving contention. The present invention provides a method and system for achieving this end.

SUMMARY

The invention includes a contention resolution media access control protocol for a local area network using orthogonal frequency division multiplexing (OFDM). More particularly, the invention includes a MAC protocol for an OFDM-based LAN that is believed to be more efficient, under load, than CSMA/CD, and takes advantage of OFDM frames available on the channel physical layer. Additionally, the preferred embodiment of the invention does not require collision detection to resolve contention.

Under the inventive MAC protocol, each LAN node is assigned a LAN-unique node identifier that is the index of a Fast-Fourier transform (FFT) frequency bin or other discrete tone in the free band. The node identifier may be assigned or automatically discovered by the system. The node identifier is played in each contention cycle by each node that has data to transmit. Each contending node can easily determine which nodes are contending for transfer of data over the media channel from the presence of node identifiers within distinct frequency bins. Contention for the media channel is resolved by each contending node being giving access to the media channel in accordance with a preset order in which contending nodes will transmit.

In one aspect of the invention, the inventive method and system includes a technique for resolving contention for access to a media channel among a plurality of nodes on a local area network using orthogonal frequency division multiplexing for transfers of data and control information in a plurality of frequency bins. More particularly, the invention includes assigning at least one frequency bin of the media channel as a unique node identifier to each node; synchronizing all of the nodes to a common starting point for participation in a contention cycle; transmitting from each node contending for access to the media channel a signal in at least one frequency bin corresponding to such nodes' assigned node identifier: decoding in each contending node the node identifier from each other contending node; and granting successive access to the media channel for each contending node in an order determined by the node identifier for each such contending node.

The inventive MAC protocol is simple to implement, does not require data demodulation, does not require collision detection to resolve contention, and minimizes the time spent in resolving contention.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Overview

Figure 1:
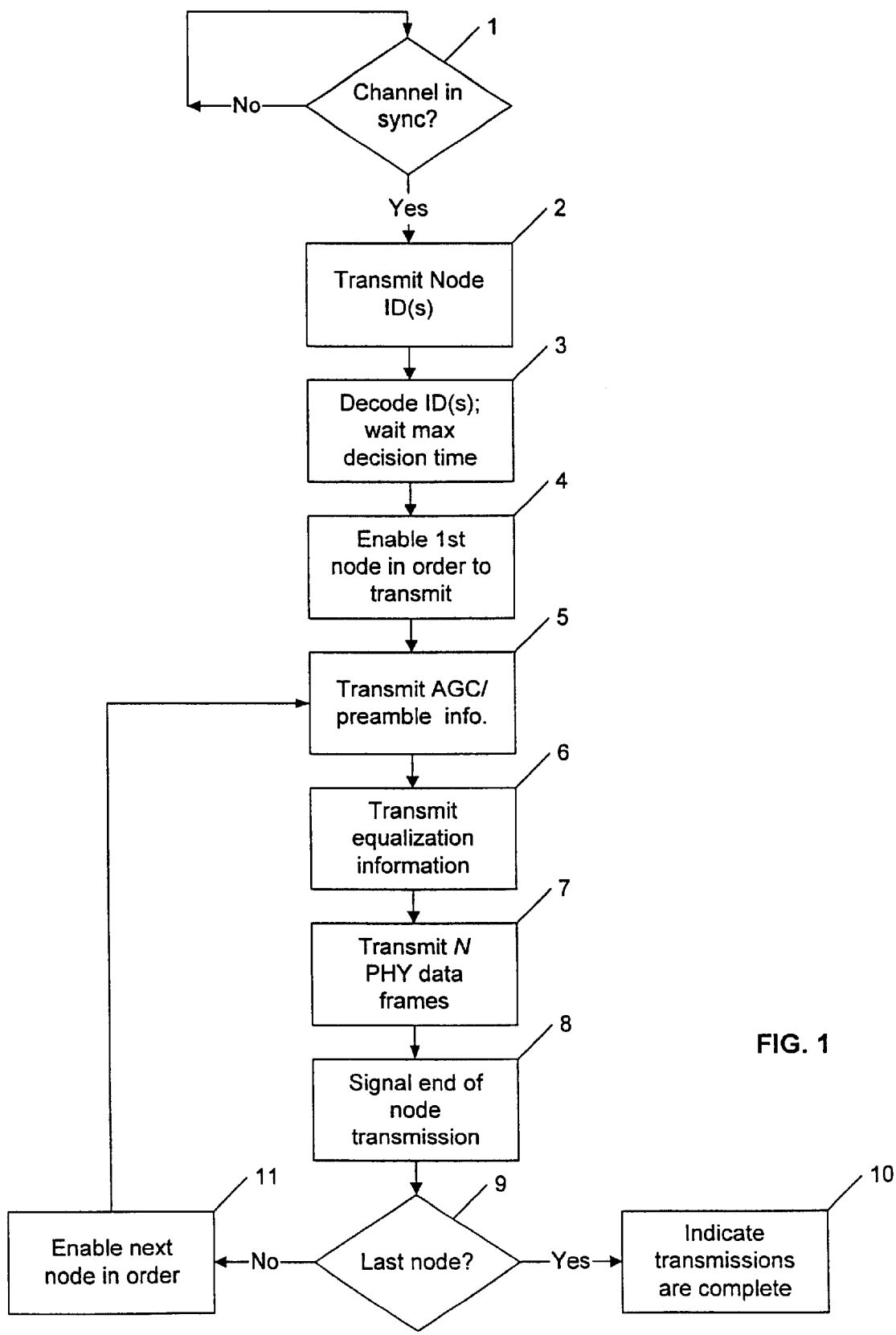
FIG. 1 is a flowchart showing MAC level protocol transmit operations in accordance with the preferred embodiment of the invention.

The invention includes a MAC protocol for an OFDM-based LAN that is believed to be more efficient, under load, than CSMA/CD, and takes advantage of OFDM frames available on the channel physical layer. Additionally, the preferred embodiment of the invention does not require collision detection to resolve contention.

In operation, the inventive MAC layer protocol communicates with a physical (PHY) layer to invoke procedures, obtain channel events and exchange data in small, symbol-sized ($N_{phyoctets}$) units. However, in the preferred embodiment, the MAC layer frame format, from address fields through CRC, is identical to that of Ethernet and IEEE 802.3 so as to maintain compatibility with system device drivers and simple Ethernet/OFDM-based LAN MAC layer bridges. The interface between the MAC and PHY layers defines the procedures and primitives for the MAC protocol layer to "drive" the channel. The PHY layer controls the physical channel signaling, modulation, carrier detection, and the electrical and mechanical interface to the channel.

The preferred embodiment of the inventive MAC protocol uses OFDM data structures and preferably complies with the following constraints:

Data is transferred between MAC and PHY layers in PHY-frame-sized chunks.

A contention PHY frame (also called a contention cycle) is used, to which nodes are synchronized, and each node "plays" a uniquely assigned identifier tone(s) in OFDM Fast-Fourier transform (FFT) frequency bins.

Idle time measurement is used to synchronize nodes to the contention frame.

Node Identifiers

Under the preferred embodiment of the inventive MAC protocol, each LAN node is assigned a LAN-unique node identifier that is the index of an FFT frequency bin. The node identifier is played in each contention cycle by each node that has data to transmit. The maximum number of nodes allowed on the LAN is thus limited by the number of FFT frequency bins, $N_{cbins}$, available for use in the system after excluding any repeated, or duplicated, tones, guard tones, marker tones, etc. For example, in one embodiment, about 64 such bins are available in the 4.5–6 MHz range. For a more robust system, each node is preferably assigned two frequency bins as a node identifier, where the frequencies are spaced apart to reduce the probability of signal dropouts or nulls affecting a contention cycle (for example, because of reflections from unterminated drops.

The assignment of frequency bins as node identifiers may be done on a static basis (e.g., manual assignment) or on a dynamic basis (e.g., each node, when added to a LAN, is assigned a node identifier that maps to one or more FFT frequency bins; see section below).

Alternatively, instead of using FFT frequency bins, other techniques may be used for tone detection. Such methods may allow the number of node identifiers to exceed the number of FFT frequency bins, and allow use of other discrete tones in the free band (i.e., not necessarily in an FFT frequency bin).

MAC Contention Protocol

Figure 2:
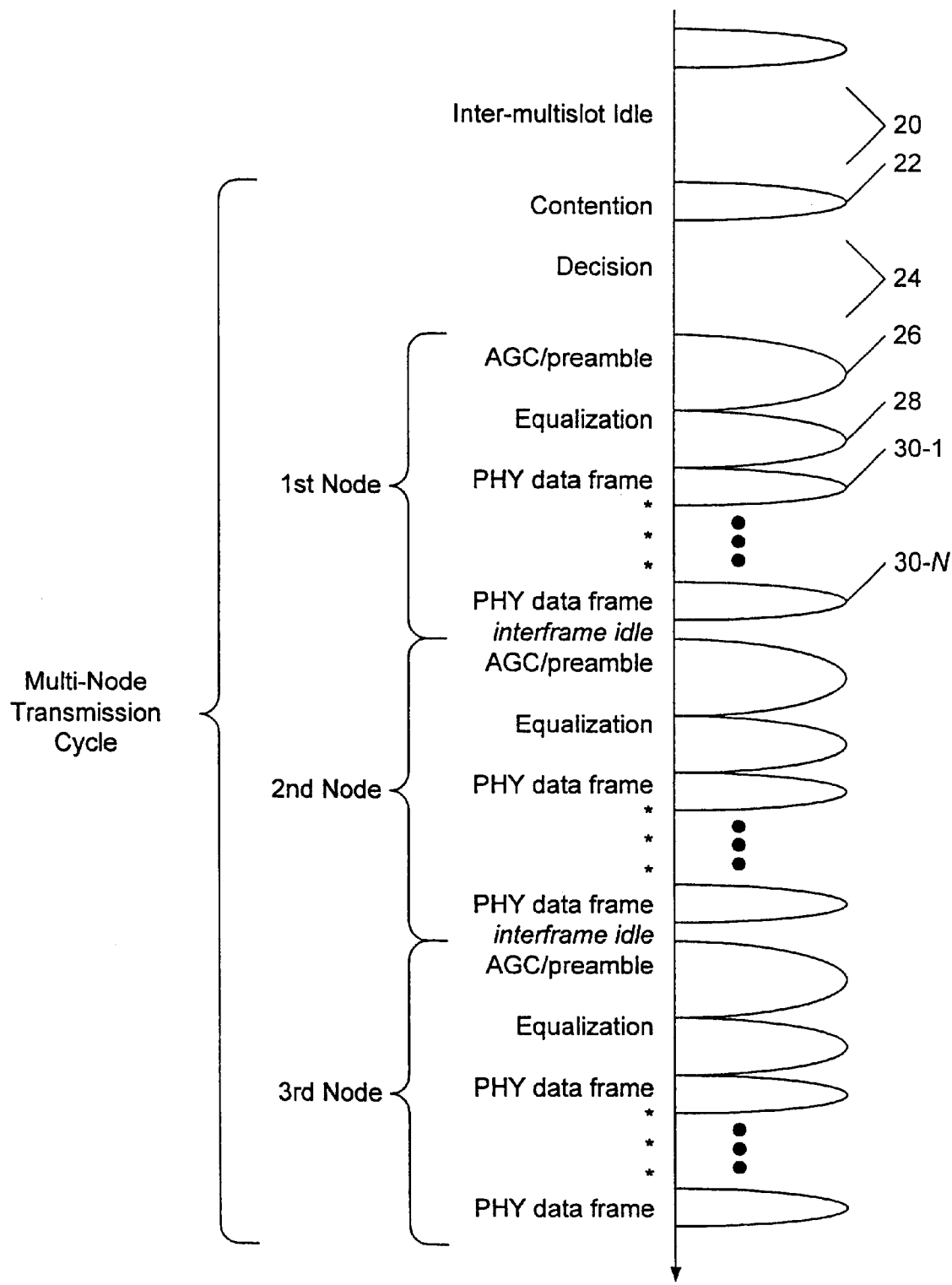
FIG. 2 is a contention/transmission time line showing channel activity during MAC level protocol transmit operations in accordance with the preferred embodiment of the invention.

FIG. 1 is a flowchart showing MAC level protocol transmit operations in accordance with the preferred embodiment of the invention. FIG. 2 is a contention/transmission time line showing channel activity during MAC level protocol transmit operations in accordance with the preferred embodiment of the invention.

STEP 1: Is Channel Synchronized? In order to synchronize nodes to a common starting point to participate in a contention cycle, in the preferred embodiment, all nodes detect a period of inactivity 20 on the channel for a required minimum inter-multislot frame idle time, $T_{idle}$ seconds. Some options for how to detect an idle channel are described below. Other methods may be used to assure that all nodes are synchronized to a common starting point, such as detecting end-of-transmission or start-of transmission events.

STEP 2: Transmit Node Identifiers. Nodes that are ready to transmit enter a contention phase 22 as "contending"

nodes. Each contending node transmits one or more tones corresponding to its assigned identifier. In the preferred embodiment, the duration of the contention phase is equivalent to the PHY frame time (FFT frame including cyclic prefix) to make it "easy" to apply an FFT process to each media frequency bin and measure an energy threshold in each bin. Optionally, all participating nodes also transmit an easily recognizable signal (see description below) that contention is about to start so that all nodes can synchronize (within $T_{sync}$ seconds) to the beginning of the contention frame.

STEP 3: Decode Identifiers. All contending nodes then decode the identifier tones received in all FFT frequency bins in a decision phase 24 in order to decipher the order in which contending nodes will transmit. (Non-contending nodes may also "listen" and decode, in order to maintain sync with all other nodes; alternatively, non-contending nodes need not listen so long as they can "sync-up" to the next contention cycle). This "decode" time should have a fixed maximum duration corresponding to the time the slowest possible node needs to perform the decode. In the preferred embodiment, contending nodes continue to transmit their contention node identifier tones during this phase, which reduces synchronization errors. If a node detects silence, it starts a timer to "see" if it is at the end of a transmission cycle.

STEP 4: Enable first node (in order) to transmit. The contending node having the first contention identifier tone in some preset order is enabled to transmit its MAC frame first, followed by the next contending node in the preset order, and so on. In the illustrated embodiment, the order is based on the lowest identifier tone to the highest identifier tone, but any desired sequence for determining the transmit order among contending nodes may be selected.

STEP 5: Transmit AGC/preamble information. In the preferred embodiment, the enabled node transmits automatic gain control (AGC) information in an AGC phase 26 for $T_{agc}$ seconds. However, other "ramp-up" and/or preamble signals and information may be transmitted during this period.

STEP 6: Transmit equalization information. In the preferred embodiment, the enabled node transmits a PHY frame 28 with predefined "equalization" information (such as DQPSK baseline start frame, or equalization for QAM). This frame is dependent on the modulation technology used by the PHY. The MAC protocol does not need to "know" about this frame 28, other than how much channel bandwidth the equalization frame occupies ($N_{eq}$ PHY frames).

STEP 7: Transmit data frames. The enabled node then transmits N PHY frames 30-1 . . . 30-N that compose a MAC frame. In the preferred embodiment, if the last PHY frame contains less than $N_{phyoctets}$ MAC octets, it is padded out (e.g., with 0s or 1s) to $N_{phyoctets}$.

STEP 8: Signal end of node transmission. After the PHY frames are transmitted, the enabled node preferably transmits an end-of-frame signal that indicates the end of transmission of its MAC frame. Inter-frame idle periods, or some other physical layer signal, may be employed between MAC frames as convenient frame delimiters. If a guard tone is employed (see below), following the end-of-frame signal, the enabled node ceases transmission of the guard tone. All nodes decode the end-of-frame signal. The formerly enabled node must then wait until the next contention cycle before being eligible to transmit data again.

STEP 9: Last node? A determination is made as to whether the enabled node is the last node in order.

STEP 10: (Conditionally) Indicate transmissions are complete. If the enabled node is the last node in order, the enabled node indicates to all other nodes that all transmissions are complete. This may be done by withdrawing a carrier or some other signal (see below). After the interframe idle time elapses, another contention cycle can occur.

STEP 11: (Conditionally) Enable next node in order. If the enabled node is not the last node in order, the next node in the present order is enabled to transmit next. In the illustrated embodiment, the contending node with the next highest contention identifier tone follows with its transmission.

STEPS 5–11 are repeated until the last participating node finishes. Note that no other nodes are "allowed" to jump into contention until the beginning of the next contention cycle (i.e., after a channel idle period 20).

One of skill in the art will appreciate that the inventive MAC protocol is simple to implement, does not require data demodulation, does not require collision detection to resolve contention, and minimizes the time spent in resolving contention.

Idle Detection and Synchronization

An important "enabler" of the inventive MAC contention mechanism is that all nodes can synchronize to the beginning of a contention cycle. Within $T_{sync}$ seconds, all participating nodes must begin their contention transmission. In the preferred embodiment, the MAC protocol depends on a requisite amount of idle-channel time before a contention cycle. All nodes maintain a timer to track this time and after the timer expires, if a node is ready to transmit, it can. For this means of synchronization to work, nodes must (1) reliably detect an idle channel and (2) synchronize among themselves, despite clock variance among nodes, after a very long amount of idle time. If nodes drift too far out of synchronization, the contention phase can easily fail, which can result in an errant multi-node transmission cycle in which most, if not all, MAC frames are corrupted.

In the preferred embodiment, nodes must detect an idle channel indicator in a short-enough time period ($T_{cd}$ seconds) so as to either participate in the immediate contention cycle, or decide that it is "too late" and wait for the next contention cycle. For instance, if a period of idle channel time has elapsed, greater than $T_{idle}$ seconds, and node A is ready to transmit, it begins transmission immediately. If node B becomes ready almost $T_{cd}$ seconds later, node B also begins transmission. In this worst-case scenario, the contention cycle must not be invalidated by node B's "near late" participation. But if node B becomes ready to transmit more than $T_{cd}$ seconds after node A, node B must recognize that the channel is not idle and defer its participation until the next contention cycle. In the preferred embodiment, $T_{cd}$ is chosen to accommodate the worst-case propagation delay and carrier detect processing time.

Suitable detection of an idle channel may be accomplished by one of the following techniques:

(1) Wide-band silence detection. A first method requires that each node detect silence over all frequency bins used for node identification. The advantage of this scheme is that no frequency bins are reserved for the purpose of detecting an idle channel state. However, this method requires choosing a correct energy threshold, whether averaging in the time domain or per-bin (after an FFT process). Each receiving node may be required to obtain the channel characteristics from each combination of transmitting nodes. Further, channel characteristics can change during network operation.

(2) Guard tones. A second method requires that each contending node transmit a guard tone during a contention cycle and data frames. This scheme reserves one or more frequency bins for transmittal of a signal that reliably indicates that the channel is active (not idle). Using this technique, each contending node starts transmitting a carrier signal when the node begins a contention cycle. To ensure that all other nodes detect that this node is "actively" participating in contention, each enabled node continues transmitting the carrier signal after that node's entire MAC frame transmission is complete. Thus, the carrier signal continues to be transmitted until every contending node is enabled and transmits its MAC frame.

Figure 3:
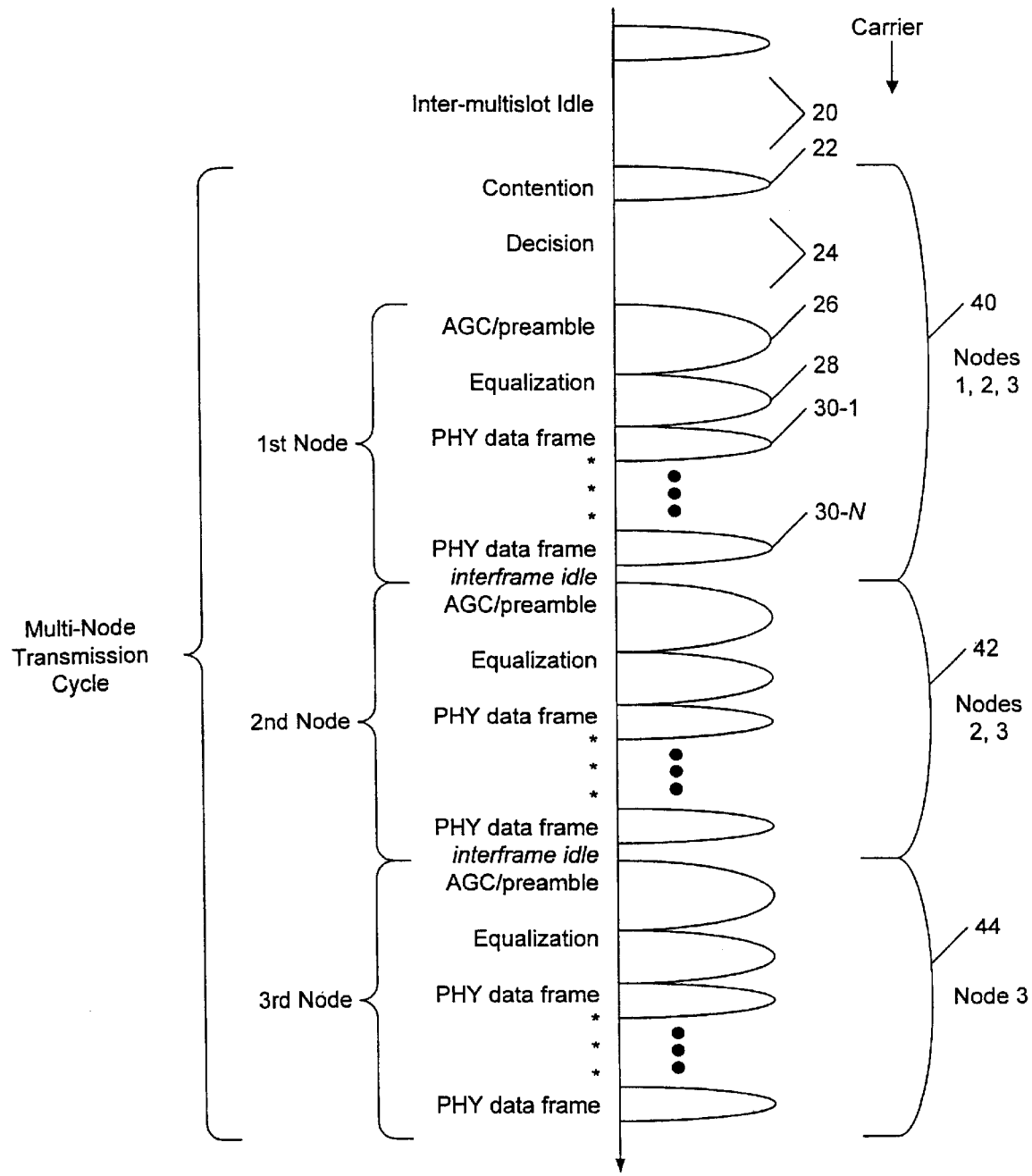
FIG. 3 is a contention/transmission time line with guard tones, showing channel activity during MAC level protocol transmit operations in accordance with a first alternative embodiment of the invention.

FIG. 3 is a contention/transmission time line with guard tones, showing channel activity during MAC level protocol transmit operations. In the illustrated embodiment, assuming three contending nodes, all three nodes transmit the carrier signal 40 while the first node is enabled and transmitting. After the first node is finished transmitting, it ceases to transmit the carrier signal, and the two remaining nodes transmit the carrier signal 42 while the second node is enabled and transmitting. After the second node is finished transmitting, it ceases to transmit the carrier signal, and the remaining node transmits the carrier signal 44 while it is enabled and transmitting. After the third node is finished transmitting, it ceases to transmit the carrier signal.

For a particular node receiver, it would be ideal if guard tone detection could be performed before the FFT process completes so as to minimize the carrier detect time, $T_{cd}$, thus resulting in better channel utilization. However, it is possible that "notches" can occur in the frequency band and therefore it may be necessary to duplicate the guard tone in more than one frequency bin.

The advantages of using a guard tone include the following:

It should be easier to discover a reliable energy threshold for one or more predefined guard bins than over the whole spectrum. If a guard tone is transmitted at certain times when other tones are not (e.g., prior to the contention phase, during the contention-decision time, or between MAC frames), the carrier signal is readily distinguishable from the other tones. Nodes will be able to set energy thresholds for guard tone detection accordingly.

If a guard signal can be recognized more quickly than other silence detection or start/end markers, better channel utilization results.

If nodes are beyond $T_{sync}$ seconds out of synchronization at the beginning of a contention cycle, and even though most of the MAC frames are corrupted, the guard tone will eventually drop, allowing nodes to easily recover "idle-channel" synchronization.

Note that reserving bins for a guard tone diminishes the channel bandwidth. Further, use of guard tones may require a dedicated time interval (e.g., just prior to a contention cycle) so that receiving nodes can "train" on the guard tone and set their detection threshold. This additional time, although minimal, would reduce channel bandwidth utilization. Lastly, during contention, all participating nodes transmit simultaneously in the guard tone bins, which increases the total amount of radiated energy.

Figure 4:
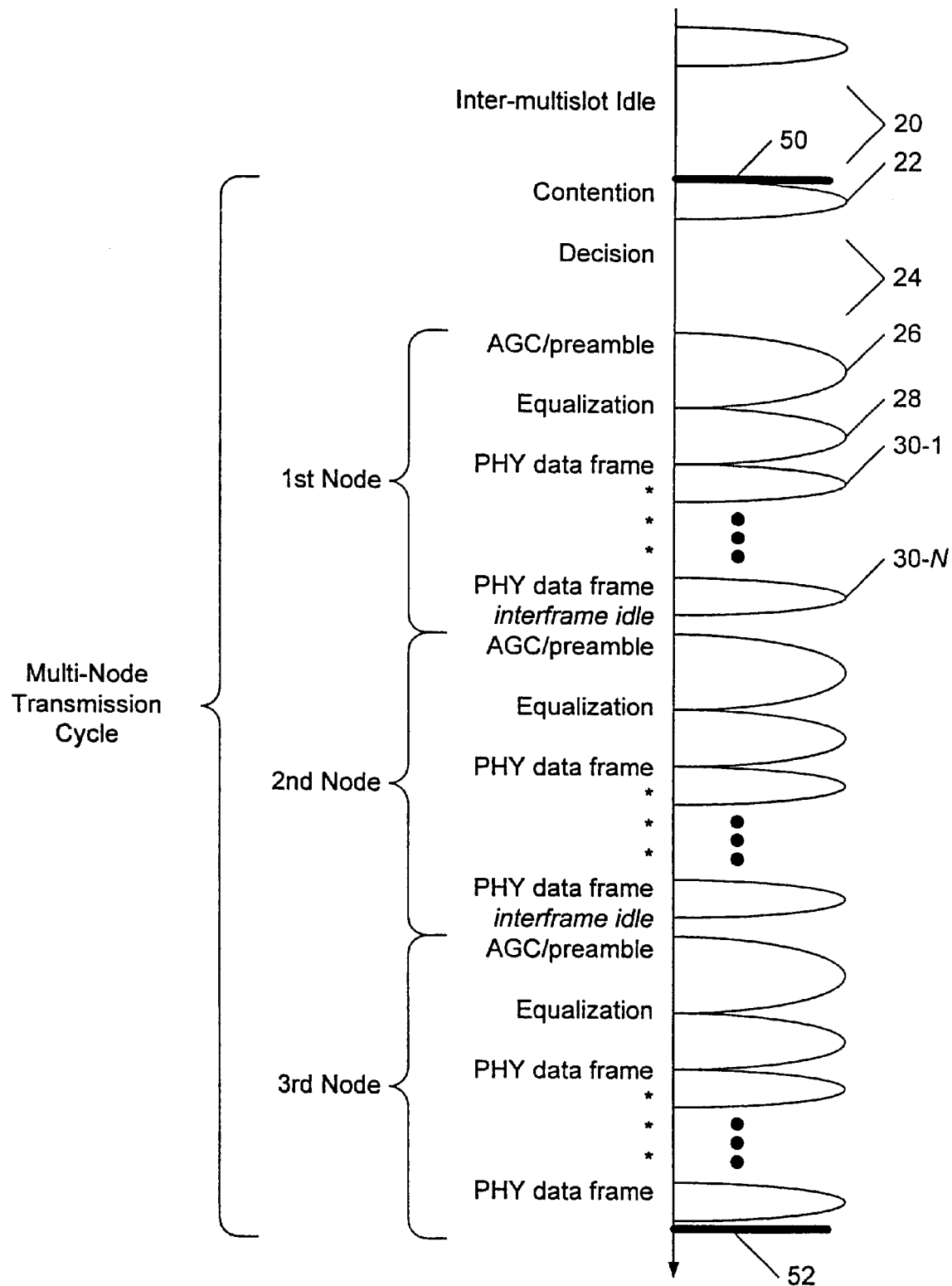
FIG. 4 is a contention/transmission time line with start-of-transmission and end-of-transmission signals, showing channel activity during MAC level protocol transmit operations in accordance with a second alternative embodiment of the invention.

(3) Start-of-transmit/End-of-transmit signal. Rather than reserve guard bins to signal an idle channel, a third method employs an easy-to-recognize start-of-transmit (SOT) signal just before the contention cycle, and an end-of-transmit (EOT) signal following either each MAC frame or only the last MAC frame. FIG. 4 is a contention/transmission time line showing channel activity during MAC level protocol transmit operations, showing an SOT signal 50 and an "after last MAC frame" EOT signal 52.

After the last MAC frame of a multi-node transmit cycle, all nodes recognize the last EOT signal 52 as a "begin idle channel" signal. When a node enters contention, all nodes recognize the SOT signal 50 as an "end idle channel" signal. Since multiple nodes enter contention roughly simultaneously, they transmit the SOT signal 50 roughly simultaneously. Thus, the SOT signal 50 must be distinguishable by all other nodes so as to reliably recognize the transition from channel-idle to channel-active.

The advantages of the SOT/EOT method include the following:

No frequency bins are reserved for an idle detection signal. The same bins used for the SOT/EOT signals may be reused for data modulation.

Since nodes simultaneously transmit the SOT signal 50 during a short window, rather than a guard signal for the entire duration of their contention/MAC-frame-transmission, the total amount of radiated energy is lower than the guard tone method.

Note that, to ensure reliability, this method may require more channel time than a carrier signal transition before and after a multi-node transmit cycle. Also, since the SOT signal 50 and EOT signal 52 happen at discrete points time, if nodes "miss" detecting such signals, channel errors result. Lastly, if nodes are beyond $T_{sync}$ seconds out of synchronization at the beginning of a contention cycle, resulting in multiple and/or corrupted EOT signals 52 from errant node (s), all nodes may lose "idle-channel" synchronization. A means to recover idle-channel synchronization must be employed (see below).

End-of-Frame Indication

In addition to start-of-contention synchronization, nodes must be synchronized to the end-of-frame (MAC frame) in the multi-node transmission cycle. After the contention cycle, all nodes have the results of the contention process, which includes a count of how many nodes are contending. Each node can use end-of-frame indicators to count MAC frames, recognizing the end of each MAC frame, without processing a length field. Thus, nodes do not have to predict the end-of-frame, but can recognize it on the channel. However, if "all-spectrum" silence detection, a guard tone, or an SOT/EOT signal is employed for purposes of detecting an idle channel, only nodes participating in contention need to know the correct results of contention. In such cases, the non-participating nodes do not need to "listen" for end-of-frame indicators. Otherwise, all nodes must process the contention results and count end-of-frame indicators to synchronize with the contention cycles.

Two techniques for indicating the end-of-frame for a MAC frame suitable for use with the invention are:

(1) Short silence. End-of-frame can be signaled by a short silence period that is distinguishable from the longer silence period prior to a contention cycle. Nodes recognize the end of a frame by observing a silence period of at least $T_{fridle}$ seconds. A key advantage of this method is that, if a node is "lost" within a multi-node transmit cycle, it needs only to wait for a longer period of silence, $T_{idle}$ seconds in duration, before synchronizing on the next contention cycle.

(2) End-of-frame signal. Instead of relying on silence/energy detection, a discrete signal can be used that is easily detected by all nodes to indicate the end-of-frame. This signal may be, for example, an EOT signal following each MAC frame, or a special PHY-frame symbol, or phase reversals in certain frequency bins.

Error Recovery

A general condition (error) that can occur with a practical implementation of the inventive MAC protocol is loss of "idle-channel synchronization." For instance, where a guard tone is used to indicate idle channels, some node could misinterpret noise as carrier, thus not detecting channel silence for the correct period of time, resulting in corrupted transmission. The MAC layer protocol and PHY layer are preferably designed to recover from these errors even though they are designed so that the errors should not happen under normal operating conditions. If recovery is not possible, then the error condition is sustained, and a node should report the error condition to a network management system or turn on an error indicator (e.g., an LED) to signal a node user.

One type of error condition that may occur is that at least one node fails to recognize an end-of-frame indication. Thus, the node fails to transmit its MAC frame. Other nodes that are counting end-of-frames then have to rely on carrier loss, or silence detection (e.g., for $T_{idle}$ seconds) to regain synchronization. If this happens, any remaining nodes waiting to transmit in the multi-node transmit cycle must cancel their transmissions and participate in another contention cycle.

If an error condition can be remedied, nodes should automatically recover synchronization and continue operation. Thus, once synchronization is lost, manual intervention in every node should not be required to bring the LAN back on line.

Heartbeat France

In the preferred embodiment of the invention, in order to facilitate LAN monitoring, troubleshooting, automatic node ID discovery, and maintenance of idle-channel synchronization, all nodes are required to enter a normal contention cycle and transmit at least a minimal, predefined "heartbeat" MAC frame every $T_{heartbeat}$ seconds.

The heartbeat eases passive monitoring and troubleshooting of the LAN because all nodes are required to transmit predefined data at fixed intervals. A monitoring device (e.g., a regular node with enhanced monitoring capabilities) can be plugged into the LAN on various extensions to record signal quality changes and isolate problems. The passive monitor would also instantly know which nodes are on-line, or verify that all nodes can be "heard" at each point on the LAN. Also, since the guard tone (if utilized), and contention cycles appear periodically, as nodes join the LAN they can determine (if necessary) energy levels for detecting the guard tone or contention tones. (Of course, the first node to join the LAN must use preconfigured energy thresholds. However, as another node joins the LAN, the first node can listen to the new node's signal to determine energy levels.)

Node ID Discovery

Rather than require a node to be preconfigured with an identification (ID) number corresponding to a contention tone index, it is desirable that a node discover a LAN-unique ID when joining the LAN, or after reset/re-initialization. One aspect of the inventive MAC protocol includes a simple initialization protocol for node ID discovery. In particular, a node joining the LAN can follows these steps to discover a LAN-unique ID number:

(1) Upon initial power-up, a node waits for a period of time before proceeding with the next step. This reduces the probability of node ID collisions (see below). The time a node waits is preferably a function of its MAC address, which is a unique number. In the preferred embodiment, a 32-bit cyclic redundancy check (CRC) value is computed for the MAC address, and the low 22 bits of the CRC value is used as the number of microseconds to wait before the node proceeds to the next step. This time is a maximum of approximately 4 seconds.

(2) The node "listens" to the channel for at least $2T_{heartbeat}$ (see above) seconds and records and counts ID numbers from nodes sending anything but "join-request" messages (see below).

(3) The node then picks an ID number that does not appear to be in use. Note that it is possible that another node was joining the LAN at approximately the same time, and picks the same ID number.

(4) The node enters a contention cycle as soon as possible and sends a message to the system broadcast MAC address requesting confirmation of the node's chosen ID number. This message is called a "join-request" and the MAC frame fields indicate that the message is to be delivered to the local MAC-management entity in each receiving node and not delivered to higher layers or forwarded in a bridged LAN. Several cases can result:

(a) After choosing an ID number, the node's transmission is deferred by a preempting contention cycle (i.e., the node was not ready in time) and the node detects that another node had already picked the same ID number. The node then changes is ID number choice to another (apparently) unused number, and sends a new "join-request" message.

(b) Two nodes happen to choose the same ID number close enough in time that they both participate in contention with the same ID number. This results in frame collision and a CRC error.

(c) A slightly-malfunctioning node missed participation in the required heartbeat transmit cycle and its ID number is now duplicated by the new node. The new node's transmission could possibly result in frame collision and a CRC error.

(5) All nodes that successfully receive the join-request message respond with either a "join-confirmation" message, if a node thinks the ID is unassigned, or "join-rejection" message if a node thinks the ID has been assigned.

(6) If the new node receives nothing, it assumes that its join request message collided with another node's join request message, and thus the new node starts the join process over from Step 1.

(7) If the new node receives at least one join-rejection message, it starts the process over from Step 1, avoiding choosing the rejected ID number again.

(8) It is possible that one of the confirmations was missed, or corrupted (i.e., has an invalid CRC). If the new node does not receive a confirmation within a certain amount of time from each node the new node counted while listening to heartbeat contention cycle(s) (in step 2), the new node starts the join process over from Step 1.

(9) If the new node exceeds a maximum number of join attempts, it declares an unrecoverable error and reports the error condition to the network management entity or the user.

Computer Implementation

Aspects of the invention may be implemented in hardware or software, or a combination of both. However, preferably, the algorithms and processes of the invention are implemented in one or more computer programs executing on programmable systems each comprising at least one processor (e.g., a DSP), at least one data storage system (including volatile and non-volatile memory and/or storage elements), at least one input device, and at least one output device. Program code is applied to input data to perform the functions described herein and generate output information. The output information is applied to one or more output devices, in known fashion.

Each program may be implemented in any desired computer language (including machine, assembly, high level procedural, or object oriented programming languages) to communicate with a computer system. In any case, the language may be a compiled or interpreted language.

Each such computer program is preferably stored on a storage media or device (e.g., ROM, CD-ROM, tape, or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, other embodiments are within the scope of the following claims.

What is claimed is:

1. A method for resolving contention for access to a media channel among a plurality of nodes on a local area network using orthogonal frequency division multiplexing for transfers of data and control information in a plurality of frequency bins, including the steps of:
   (a) assigning at least one frequency bin of the media channel as a unique node identifier to each node;
   (b) synchronizing all of the nodes to a common starting point for participation in a contention cycle;
   (c) transmitting from each node contending for access to the media channel a signal in at least one frequency bin corresponding to such nodes' assigned node identifier;
   (d) decoding in each contending node the node identifier from each other contending node;
   (e) enabling each contending node to successively access the media channel for transfer of data and control information in an order determined by the node identifier for each such contending node.

2. The method of claim 1, further including the step of transmitting automatic gain control (AGC) information on the media channel in an AGC phase for each enabled contending node.

3. The method of claim 1, further including the step of transmitting equalization information on the media channel for each enabled contending node.

4. The method of claim 1, further including the step of transmitting a media access control layer frame, comprising at least one, physical layer frame for the media channel, for each enabled contending node.

5. The method of claim 4, further including the step of transmitting an end-of-frame signal after completing transmitting of the media access control layer frame.

6. The method of claim 1, wherein the step of assigning includes a method of automatically discovering a unique node identifier for each node.

7. A method for resolving contention for access to a media channel among a plurality of nodes on a local area network using orthogonal frequency division multiplexing for transfers of data and control information in a plurality of frequency bins, including the steps of:
   (a) assigning at least one frequency bin of the media channel as a unique node identifier to each node;
   (b) synchronizing all of the nodes to a common starting point for participation in a contention cycle by determining if the media channel is in an idle state for a selected idle time;
   (c) transmitting from each node contending for access to the media channel a signal in at least one frequency bin corresponding to such nodes' assigned node identifier;
   (d) decoding in each contending node the node identifier from each other contending node;
   (e) enabling each contending node to successively access the media channel for transfer of data and control information in an order determined by the node identifier for each such contending node.

8. A system for resolving contention for access to a media channel among a plurality of nodes on a local area network using orthogonal frequency division multiplexing for transfers of data and control information in a plurality of frequency bins, including:
   (a) means for assigning at least one frequency bin of the media channel as a unique node identifier to each node;
   (b) means for synchronizing all of the nodes to a common starting point for participation in a contention cycle;
   (c) means for transmitting from each node contending for access to the media channel a signal in at least one frequency bin corresponding to such nodes' assigned node identifier;
   (d) means for decoding in each contending node the node identifier from each other contending node;
   (e) means for enabling each contending node to successively access the media channel for transfer of data and control information in an order determined by the node identifier for each such contending node.

9. The system of claim 8, further including means for transmitting automatic gain control (AGC) information on the media channel in an AGC phase for each enabled contending node.

10. The system of claim 8, further including means for transmitting equalization information on the media channel for each enabled contending node.

11. The system of claim 8, further including means for transmitting a media access control layer frame, comprising at least one physical layer frame for the media channel, for each enabled contending node.

12. The system of claim 11, further including means for transmitting an end-of-frame signal after completing transmitting of the media access control layer frame.

13. The system of claim 8, wherein the means for assigning includes means for automatically discovering a unique node identifier for each node.

14. A system for resolving contention for access to a media channel among a plurality of nodes on a local area network using orthogonal frequency division multiplexing for transfers of data and control information in a plurality of frequency bins, including:
   (a) means for assigning at least one frequency bin of the media channel as a unique node identifier to each node;
   (b) means for synchronizing all of the nodes to a common starting point for participation in a contention cycle by determining if the media channel is in an idle state for a selected idle time;
   (c) means for transmitting from each node contending for access to the media channel a signal in at least one frequency bin corresponding to such nodes' assigned node identifier;

(d) means for decoding in each contending node the node identifier from each other contending node;

(e) means for enabling each contending node to successively access the media channel for transfer of data and control information in an order determined by the node identifier for each such contending node.

15. A computer program, stored on a computer-readable medium, for resolving contention for access to a media channel among a plurality of nodes on a local area network using orthogonal frequency division multiplexing for transfers of data and control information in a plurality of frequency bins, the computer program comprising instructions for causing a computer to:

(a) assign at least one frequency bin of the media channel as a unique node identifier to each node;

(b) synchronize all of the nodes to a common starting point for participation in a contention cycle;

(c) transmit from each node contending for access to the media channel a signal in at least one frequency bin corresponding to such nodes assigned node identifier;

(d) decode in each contending node the node identifier from each other contending node;

(e) enable each contending node to successively access the media channel for transfer of data and control information in an order determined by the node identifier for each such contending node.

16. The computer program of claim 15, further including instructions for causing a computer to transmit automatic gain control (AGC) information on the media channel in an AGC phase for each enabled contending node.

17. The computer program of claim 15, further including instructions for causing a computer to transmit equalization information on the media channel for each enabled contending node.

18. The computer program of claim 15, further including instructions for causing a computer to transmit a media access control layer frame, comprising at least one physical layer frame for the media channel, for each enabled contending node.

19. The computer program of claim 18, further including instructions for causing a computer to transmit an end-of-frame signal after completing transmitting of the media access control layer frame.

20. The computer program of claim 15, wherein the instructions for causing a computer to assign includes instructions for causing a computer to automatically discover a unique node identifier for each node.

21. A computer program, stored on a computer-readable medium, for resolving contention for access to a media channel among a plurality of nodes on a local area network using orthogonal frequency division multiplexing for transfers of data and control information in a plurality of frequency bins, the computer program comprising instructions for causing a computer to:

(a) assign at least one frequency bin of the media channel as a unique node identifier to each node;

(b) synchronize all of the nodes to a common starting point for participation in a contention cycle by determining if the media channel is in an idle state for a selected idle time;

(c) transmit from each node contending for access to the media channel a signal in at least one frequency bin corresponding to such nodes' assigned node identifier;

(d) decode in each contending node the node identifier from each other contending node;

(e) enable each contending node to successively access the media channel for transfer of data and control information in an order determined by the node identifier for each such contending node.

* * * * *